(12) United States Patent
Linz et al.

(10) Patent No.: US 12,522,797 B2
(45) Date of Patent: Jan. 13, 2026

(54) MULTIPORT DEVICE FOR CONNECTING A LOOP TO ONE PORT OF A BIOREACTOR, AND PERFUSION OR CONCENTRATED FED-BATCH SETUP FOR PERFORMING AN UPSTREAM PROCESS OF CELL CULTURE

(71) Applicant: Sartorius Stedim Biotech GmbH, Goettingen (DE)

(72) Inventors: Fritjof Linz, Goettingen (DE); Attila Herczeg, Bohemia, NY (US)

(73) Assignee: SARTORIUS STEDIM BIOTECH GMBH (DE)

( * ) Notice: Subject to any disclaimer, the term of this patent is extended or adjusted under 35 U.S.C. 154(b) by 916 days.

(21) Appl. No.: 17/719,240

(22) Filed: Apr. 12, 2022

(65) Prior Publication Data
US 2023/0323274 A1 Oct. 12, 2023

(51) Int. Cl.
*C12M 1/00* (2006.01)
*C12M 1/34* (2006.01)

(52) U.S. Cl.
CPC ............ *C12M 41/34* (2013.01); *C12M 23/14* (2013.01); *C12M 23/28* (2013.01); *C12M 41/26* (2013.01)

(58) Field of Classification Search
CPC ...... C12M 23/00; C12M 23/14; C12M 23/28; C12M 29/16; C12M 29/18; C12M 41/26; C12M 41/34; C12M 47/10; A61N 2005/1058; A61N 5/1038; A61N 5/1039; A61N 5/1049; A61N 5/1067; A61N 5/1069; A61N 5/107; A61B 2034/107; A61B 2034/2063; A61B 2090/364; A61B 2090/378; A61B 8/085; A61B 8/4218; A61B 8/4245; A61B 8/5223; A61B 8/5238; A61B 8/5261
See application file for complete search history.

(56) References Cited

U.S. PATENT DOCUMENTS

| 5,988,422 | A | 11/1999 | Vallot |
| 6,544,424 | B1 | 4/2003 | Shevitz |
| 7,875,448 | B2 | 1/2011 | Furey |
| 9,469,671 | B2 | 10/2016 | Niazi |
| 2005/0158851 | A1 | 7/2005 | Furey |
| 2006/0240546 | A1 | 10/2006 | Goodwin et al. |

FOREIGN PATENT DOCUMENTS

| EP | 3460036 A1 | 3/2019 |
| WO | 2012026978 A2 | 3/2012 |
| WO | 2014085034 A1 | 6/2014 |

(Continued)

Primary Examiner — Lydia Edwards
(74) Attorney, Agent, or Firm — Dilworth IP, LLC

(57) ABSTRACT

A multiport device for connecting a loop, preferably a tangential flow filtration loop or a sensor loop, to one port of a bioreactor, preferably a single-use bioreactor, is configured to be fixed to the port of the bioreactor. The multiport device includes a first flow path configured for withdrawing fluid from the bioreactor, and a second flow path configured for supplying fluid to the bioreactor. The first flow path has a first end adapted to be in fluid connection with the bioreactor, and a second end adapted to be connected to an inlet of the loop. The second flow path has an outer end adapted to be connected to an outlet of the loop, and a mouth adapted to be in fluid connection with the bioreactor. The mouth of the second flow path is distanced from the first end of the first flow path by at least 5 mm, preferably 10 mm.

13 Claims, 4 Drawing Sheets

(56) References Cited

FOREIGN PATENT DOCUMENTS

| WO | 2015039115 A1 | 3/2015 |
| WO | 2018015386 A1 | 1/2018 |
| WO | 2019104071 A1 | 5/2019 |
| WO | 2019199406 A1 | 10/2019 |
| WO | 2020176990 A1 | 9/2020 |

MULTIPORT DEVICE FOR CONNECTING A LOOP TO ONE PORT OF A BIOREACTOR, AND PERFUSION OR CONCENTRATED FED-BATCH SETUP FOR PERFORMING AN UPSTREAM PROCESS OF CELL CULTURE

FIELD OF THE DISCLOSURE

The invention relates to a multiport device for connecting a loop, preferably a tangential flow filtration loop, to one port of a bioreactor, preferably a single-use bioreactor. The invention further relates to a perfusion or concentrated fed-batch setup for performing an upstream process of cell culture.

BACKGROUND

Today's cell culture industry requires higher yields in the manufacturing process for biopharmaceuticals to reduce the manufacturing costs and ultimately the reduction of the therapeutic costs. Since years there is a desire to especially achieve higher yield (higher cell density) in the upstream process of mammalian cell culture. Several developments have led to the application of hollow fiber or flat filter devices to retain the cells and/or the product to obtain higher cell densities and higher product titer. The technologies applied are described as perfusion and concentrated fed-batch. Perfusion is well established in the market and has been used in the past specifically for sensitive products.

Crucial for the application of a hollow fiber device in tangential flow filtration (TFF) mode for perfusion/concentrated fed-batch is that at least two ports as connection to the bioreactor are needed. This is especially critical for single-use bioreactors where the number of ports is usually limited. To overcome the challenges of the required number of ports a technology called alternating tangential flow (ATF) has been developed. The basic concept of ATF is described in U.S. Pat. No. 6,544,424 B1, for example. However, a common problem of ATF is that not the whole content of the hollow fiber filter unit can be pumped back into the bioreactor.

Moreover, compared to ATF, using the TFF mode offers the benefit of lower stress to the mammalian cells and more consistent process conditions, and, most importantly, TFF provides for more constant flow across the surface of the membrane resulting in less or delayed fouling of the membrane and providing for more constant performance over the entire perfusion campaign. Fouling also results in lower yield of desired product in the permeate. Therefore, TFF is preferred over ATF. The challenge of providing a higher number of ports required for the process remains.

From EP 3 460 036 A1 a system for transferring chemical, pharmaceutical, and/or biological material into or out of a container is known. The system comprises a disposable container having at least one port for accessing the interior of the container. The system further comprises a transfer interface connectable to the at least one port. The transfer interface comprises a plurality of extendable transfer elements for collecting samples from the disposable container in a sterile manner. Each of the transfer elements has a corresponding biasing element for retracting the transfer element.

U.S. Pat. No. 7,875,448 B2 shows a disposable bioreactor comprising a container for holding a fluid culture, a diffuser disposed within the container; an outlet tube for drawing the culture from a bottom of the container, and an inlet tube for returning at least a portion of the culture from the outlet tube to the container through the diffuser. The diffuser is disposed above the container bottom and disposed completely within the culture when the container holds the fluid culture. The diffuser disperses the returning culture to the container into a wide, distributed stream. The diffuser combines a gas from a source external to the container with the returning culture before the dispersion to the container.

WO 2020/176990 A1 relates to a tangential flow filtration system comprising a tangential flow filtration module, and a storage vessel having an input composition such as a viscous fluid, solution, gel, paste, cream or suspension. The system further comprises a tangential flow filtration input supply tube configured to deliver input composition from multiple depths within the storage vessel to the tangential flow filtration module. The tangential flow filtration input supply tube comprises a plurality of inlet ports disposed at different heights within the storage vessel. A retentate return tube is configured to return TFF retentate from the tangential flow filtration module to the storage vessel.

SUMMARY OF THE INVENTION

It is an object of the invention to enable a perfusion or concentrated fed-batch setup in which a loop, especially a TFF loop or a sensor loop, can be connected to a single port of a bioreactor.

According to an aspect of the invention, a multiport device for connecting a loop, preferably a tangential flow filtration loop or a sensor loop, to one port of a bioreactor, preferably a single-use bioreactor, is configured to be fixed to the port of the bioreactor. The multiport device includes a first flow path configured for withdrawing fluid from the bioreactor, and a second flow path configured for supplying fluid to the bioreactor. The first flow path has a first end adapted to be in fluid connection with the bioreactor, and a second end adapted to be connected to an inlet of the loop. The second flow path has an outer end adapted to be connected to an outlet of the loop, and a mouth adapted to be in fluid connection with the bioreactor. The mouth of the second flow path is distanced from the first end of the first flow path by at least 5 mm, preferably 10 mm. Of course, it has to be ensured that the mouth of the second flow path does not directly interfere with any structural component in the bioreactor.

A major advantage of the invention is that a bioreactor having only a single port available for connecting a cell retention equipment can still be used to perform a perfusion or concentrated fed-batch process in TFF mode with a hollow fiber filter unit, which usually requires at least two different ports.

Since the mouth of the second flow path is distanced from the first end of the first flow path by at least 5 mm, preferably 10 mm, it is ensured that the medium that has just been returned from the loop into the bioreactor is not immediately sucked out again without the chance to properly mix with the remaining medium in the bioreactor. This is especially crucial in TFF mode as the medium is supplied to and sucked out of the bioreactor at the same time, whereas in ATF mode this is always done one at a time. Moreover, effective mixing of the returned medium in the bioreactor is important to save time and preserve the cells. Generally, it has to be considered that the cells should not spend more time in the loop and should not pass through the pump more often than necessary.

The multiport device according to the invention is preferably a single-piece device, possibly formed from the same material (i.e. not an assembly of connected pieces). The multiport device can thus be used as a simple adaptor between a loop and the single available port of the bioreactor.

It has turned out that the desired effect of sufficient mixing of the returned medium is well achieved with a design of the multiport device that provides a distance between the first end of the first flow path and the mouth of the second flow path which is at least three times greater than the diameter of an opening of the port.

In order to locate the mouth at a desired position in the bioreactor, the second flow path can include at least one curved, bent or angled section. However, the first flow path can also include at least one curved, bent or angled section. Generally, in order to preserve the cells in the flow paths, any curve or bending should be as smooth as possible to keep the shear stress as low as possible. While angles in such sections between 1° and 90° are generally possible, preferred angles are between 2 and 45°, and particularly preferred angles are between 5° and 35°.

According to a preferred design of the multiport device, the first flow path at least partially surrounds the second flow path. In this case a portion of the second flow path can be formed by a tube which is arranged inside a larger tube, the larger tube forming a portion of the first flow path.

According to an alternative preferred design, the first flow path is arranged next to the second flow path. For example, the first and second flow paths can be formed by separate tubes. Especially in the area where the flow paths extend through the port, the walls of the tubes may be in contact with each other.

At least the second flow path can include a flexible hose, with a free end of the flexible hose forming the mouth of the second flow path. The advantage of the flexible hose inside the bioreactor is its pliability. Compared to a rigid tube, the risk that the flexible wall of the bioreactor or any component contained therein gets damaged during transport or storage of the bioreactor in its unexpanded state is significantly reduced.

The invention also provides a perfusion or concentrated fed-batch setup for performing an upstream process of cell culture. This setup comprises at least the following: a bioreactor including a port; a loop, preferably a TFF loop or a sensor loop; a pump; a functional device, preferably a TFF unit, such as a hollow fiber filter unit, or a sensor; and a multiport device as defined above. The multiport device connects an inlet and an outlet of the loop to the bioreactor via the same port with the advantages recited above.

It is to be noted that the pump used in such a setup can provide near constant flow across the surface of the membrane, in contrast to ATF where due to the reversing flow concept the flow slows down, stops completely, and then reverses in direction.

In an advantageous embodiment of the setup according to the invention, the port is located in a first wall section of the bioreactor, and the mouth is located closer to an opposite second wall section. Preferably, the first end has another distance to the first wall section than the mouth. As there are typically mixing means provided within the bioreactor, even a small distance has the effect that the fluid is taken away by the flow, if the distances of the first end and the mouth from the first wall section are not the same.

If the composition of the medium contained in the bioreactor varies along the height, it may be advantageous to withdraw medium at one level of the medium and to return it at another level. This can be achieved with a design and arrangement of the multiport device according to which the first end of the first flow path and the mouth of the second flow path are located at different heights in the bioreactor.

In a perfusion or concentrated fed-batch setup the bioreactor usually includes a mixing means, like a stirrer or an impeller. In this case it may be preferred that the mouth is located quite close to the mixing means, at least closer than to a surrounding wall of the bioreactor.

Further, if mixing means are provided, it may be expedient that the mouth is oriented such that medium from the loop supplied to the bioreactor via the second flow path flows through the mouth in a direction basically corresponding to the current direction in the bioreactor caused by the mixing means to ensure proper mixing. However, in some cases it may be more useful that the mouth is oriented such that medium from the loop is supplied in a direction basically opposite to the current direction.

According to an advanced aspect of the invention, the multiport device can fulfill an additional further function. In particular, the multiport device can be used to deliberately influence the flow behavior of the medium in the bioreactor in a desired manner. This can be achieved with a baffle or flow guide design surrounding the second flow path.

DETAILED DESCRIPTION

Figure 1:
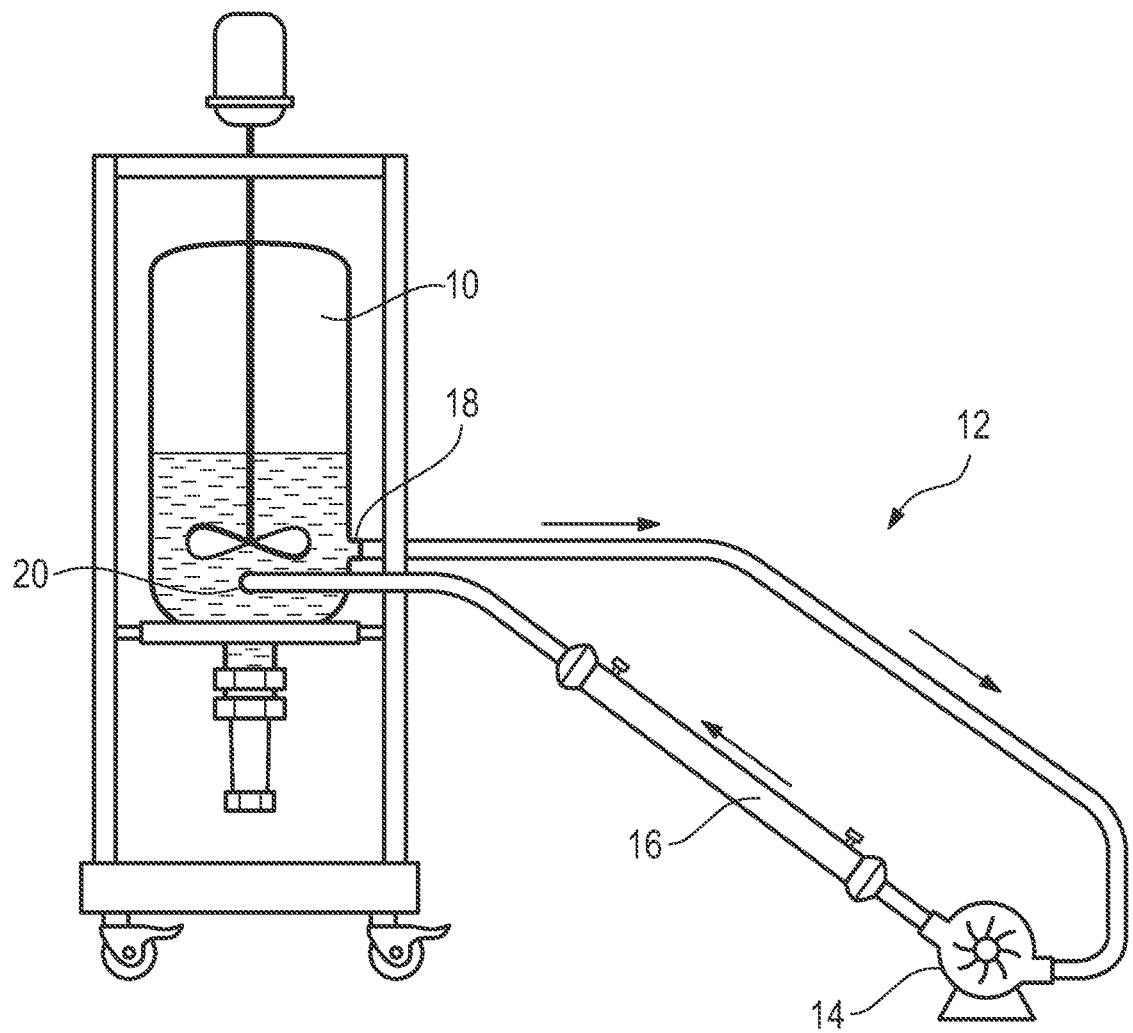
FIG. 1 shows a perfusion setup using TFF as cell retention method.

A basic perfusion setup for an upstream process of cell culture is shown in FIG. 1. The setup includes a bioreactor 10 with means for mixing a cell culture medium contained in the bioreactor 10, and a TFF loop 12. The TFF loop 12 includes a pump 14 for circulating medium from the bioreactor 10 through a hollow fiber filter unit 16 for cell retention. Cell culture medium is withdrawn from the bioreactor 10 through a first port 18 formed in a wall of the bioreactor 10 and returned to the bioreactor 10 through a second port 20 formed in the bioreactor wall at another location. The first port 18 can be considered as an outlet port of the bioreactor 10 or as an inlet port of the TFF loop 12, while the second port 20 can be considered as an inlet port of the bioreactor 10 or as an outlet port of the TFF loop 12. (For the sake of simplicity, the filtrate/permeate outlet of the TFF filter is not shown in any of the Figures.)

Figure 2:
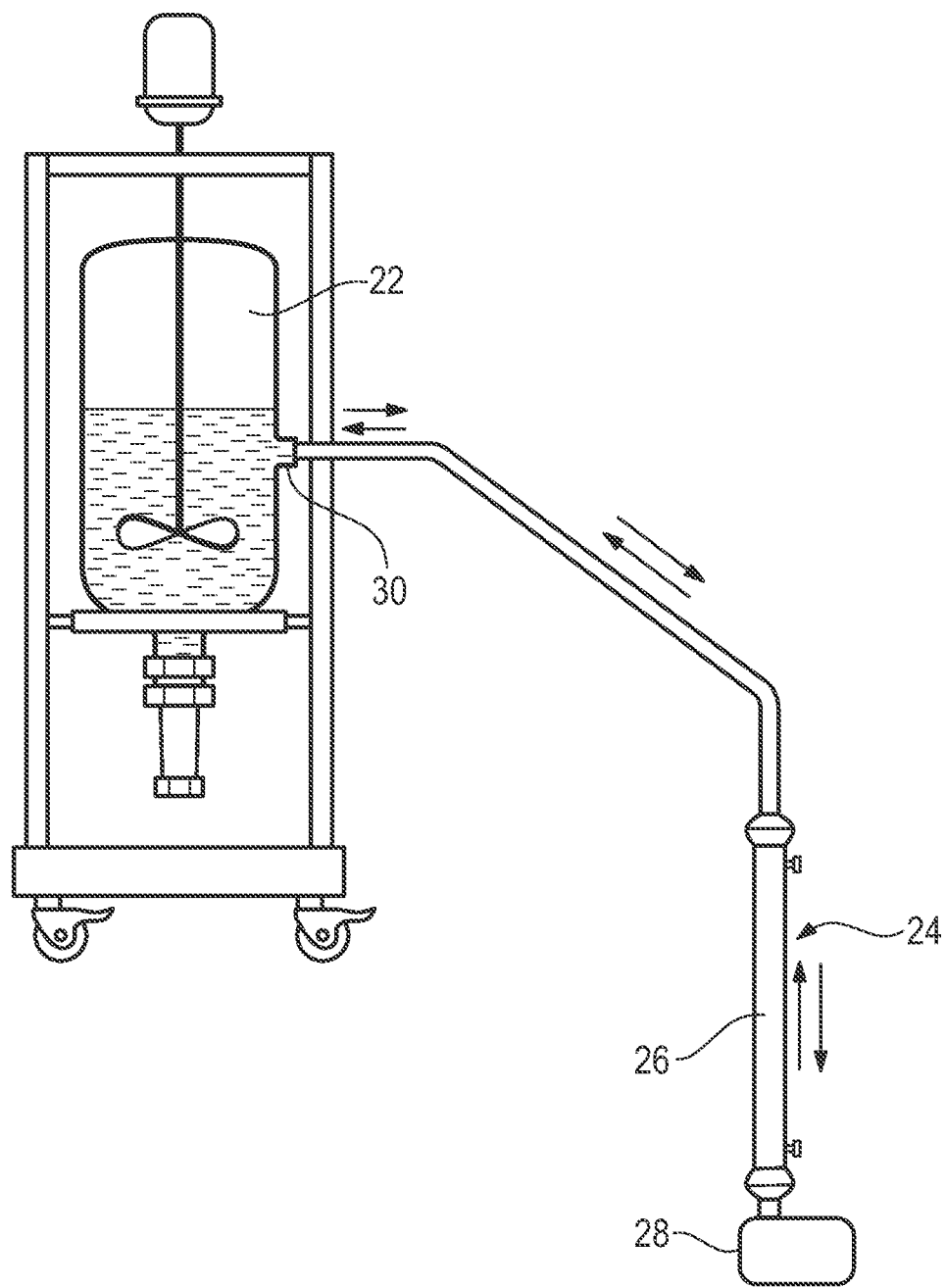
FIG. 2 shows a perfusion setup using ATF as cell retention method.

An alternative perfusion setup comprising a bioreactor 22 and an ATF module 24 is shown in FIG. 2. The ATF module 24 includes a hollow fiber filter 26 and a diaphragm pump 28. The diaphragm pump 28 is used to suck cell culture medium from the bioreactor 22 through the hollow fiber filter 26 and to urge it back into the bioreactor 22 via the same route. This means that only a single port 30 is necessary to alternatively extract medium from and return filtered medium to the bioreactor 22.

Figure 3:
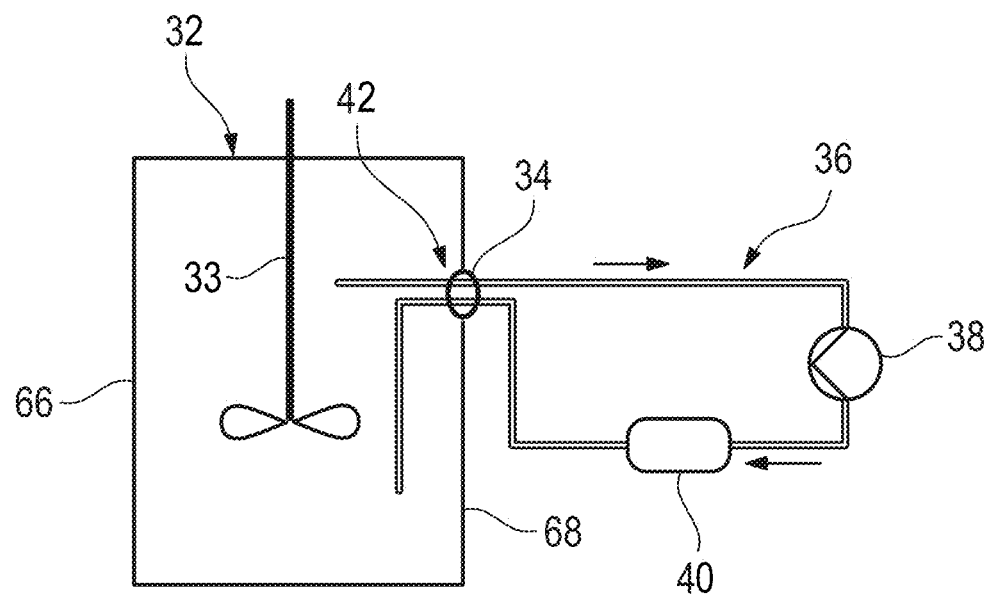
FIG. 3 shows a simplified TFF perfusion setup with a multiport device according to the invention.

FIG. 3 shows a perfusion setup which is similar to the setup shown in FIG. 1. However, similar to the setup shown in FIG. 2, the bioreactor 32 here only has a single port 34 for providing the necessary fluid connections to the TFF loop 36 with the pump 38 and the hollow fiber filter unit 40. In fact, both a bioreactor outlet (or TFF loop inlet) and a bioreactor inlet (or TFF loop outlet) are provided by a multiport device 42 which is attached to the port 34.

In order to ensure a sufficient tangential flow over the membrane of the filter unit 40, the flow rate of the pump 38 has to be chosen accordingly. It may become necessary that the overflow needs to be increased during the process, so the flow rate has to be adjusted accordingly. The optimum flow rate depends on the specifications of the membrane that is used. A typical value is up to 15,000 L/h, depending on the size of the TFF device. Another approach to choose an appropriate flow rate of the pump 38 is to achieve an exchange of a certain number of bioreactor/vessel volumes per day (vvd). Typical values are between 0.5 to 10 vvd, a preferred range is 0.5 to 3 vvd.

Figure 4:
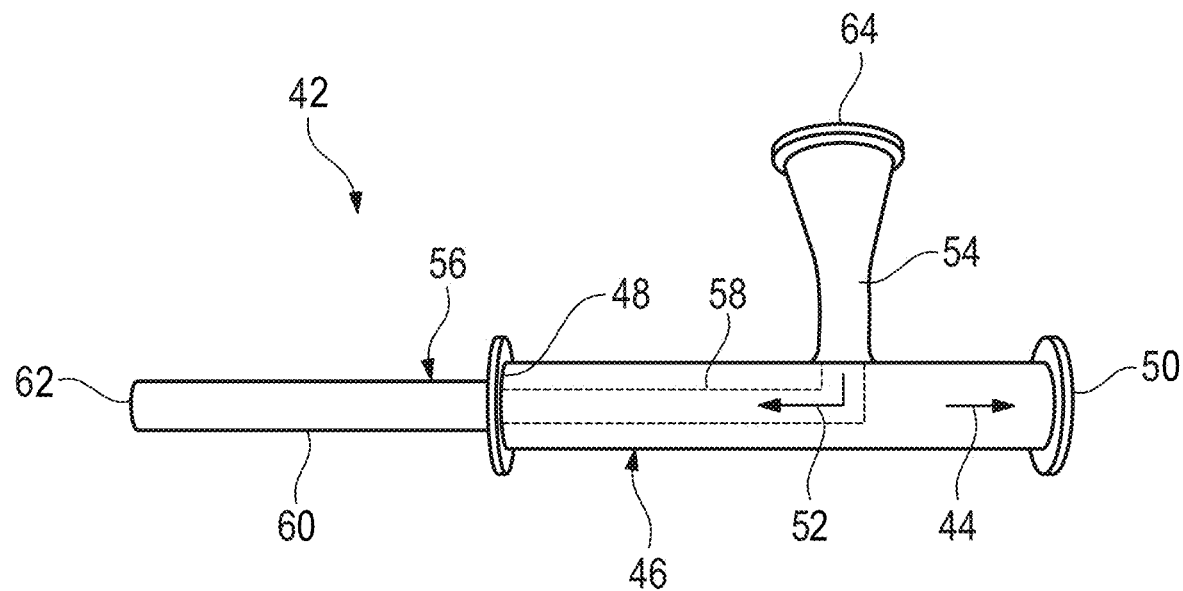
FIG. 4 shows a first embodiment of a multiport device according to the invention.

An exemplary first embodiment of the multiport device 42 is shown in FIG. 4. The multiport device 42 includes a first flow path 44 surrounded by a pipe 46. A first end 48 of the first flow path 44 is adapted to be connected to the port 34 of the bioreactor 32. The opposite second end 50 of the first flow path 44 is adapted to be connected to an inlet of the TFF loop 36. In particular, the second end 50 can be configured as a hose barb or as a Tri-Clamp connecting piece, for example.

The multiport device 42 also includes a second flow path 52 which is formed by a first tube 54 and a second tube 56. An outer end 64 of the second flow path 52 is adapted to be connected to an outlet of the TFF loop 36 ("outer" means outside of the bioreactor 32). Similar to the second end 50 of the first flow path 44, the outer end 64 of the second flow path 52 can be configured as a hose barb or as a Tri-Clamp connecting piece, for example.

The first tube 54 extends through the wall of the pipe 46 into the interior of the pipe 46 where it is connected to the second tube 56. A first portion 58 of the second tube 56 extends inside the pipe 46 towards the first end 48 of the pipe 46, and a second portion 60 of the second tube 56 projects from the pipe 46. The second flow path 52 terminates in a mouth 62.

The multiport device 42 is a one-piece device, i.e. it has no separated and loose components. The multiport device 42 can be a reusable component made of stainless steel, for example, but it can also be a single-use component made of a suitable plastic material.

When the multiport device 42 is fixed to the bioreactor 32, the first end 48 of the first flow path 44, which can include a flange, is connected in a fluid-tight manner to the port 34 of the bioreactor 32. The first flow path 44 of the multiport device 42 is used to withdraw cell culture medium from the bioreactor 32 and to feed it into the TFF loop 36, while the second flow path 52 is used to return filtered cell culture medium from the TFF loop 36 into the bioreactor 32.

It is to be noted that in the fixed state of the multiport device 42 the elongated second portion 60 of the second tube 56 ensures that the mouth 62 of the second flow path 52, through which filtered cell culture medium from the TFF loop 36 is returned into the bioreactor 32, is located at a defined position in the bioreactor 32 which has a defined minimum distance of at least 5 mm, preferably at least 10 mm, from the first end 48 of the first flow path 44, through which cell culture medium is withdrawn from the bioreactor 32 and fed into the TFF loop 36. It is thus avoided that filtered medium (retentate) which has just been fed back into the bioreactor 32 is immediately sent back into the TFF loop 36 again. Both the mouth 62 of the second flow path 52 and the first end 48 of the first flow path 44 are located in positions in which they neither contact nor directly interfere with any structural component in the bioreactor 32.

The distance between the mouth 62 of the second flow path 52 and the first end 48 of the first flow path 44, as well as the location and the orientation of the mouth 62, can be chosen as desired in dependence of at least one of the following aspects: distance to a second wall section 66 opposite a first wall section 68 of the bioreactor 32 where the port 34 is formed; fluid level in the bioreactor (32); height above the bottom of the bioreactor 32; location relative to a mixing means 33 (stirrer, impeller) provided in the bioreactor 32; flow direction caused by the mixing means 33. The second flow path 52 is shaped accordingly to fulfill the desired requirement(s). In particular, the second portion 60 of the second tube 56 may include curved, bent, angled sections or the like. Moreover, the second portion 60 of the second tube 56 can itself be designed and positioned to act as a baffle (flow breaker) or a flow guide.

Figure 5:
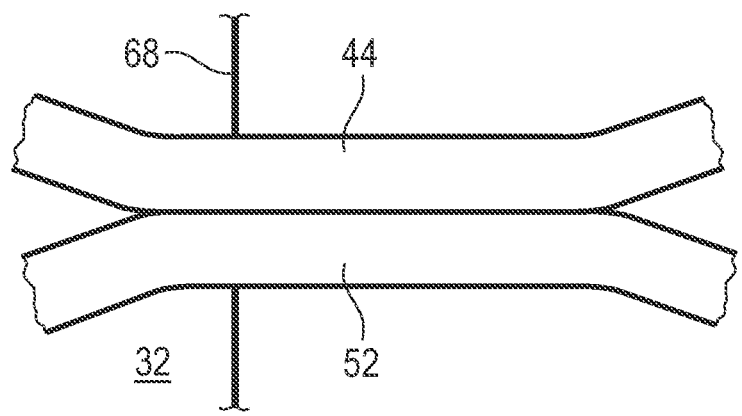
FIG. 5 shows a schematic cross section of a second embodiment of the multiport device.

FIG. 5 shows a detail of a second embodiment of the multiport device 42. Here, the first and second flow paths 44, 52 are arranged next to each other. Moreover, both flow paths 44, 52 have angled sections inside and outside of the bioreactor 32. Flat angles (less than 90°) are generally preferred in order to protect the cells from shear stress as good as possible. Depending on the actual assembly, it may be advantageous to provide only one of the two flow paths 44, 52 and/or only one of the portions of the flow paths 44, 52 (either the inside portion or the outside portion) with an angled section. Of course, any other geometry providing a "soft" curvature or bending can be used.

Figure 6:
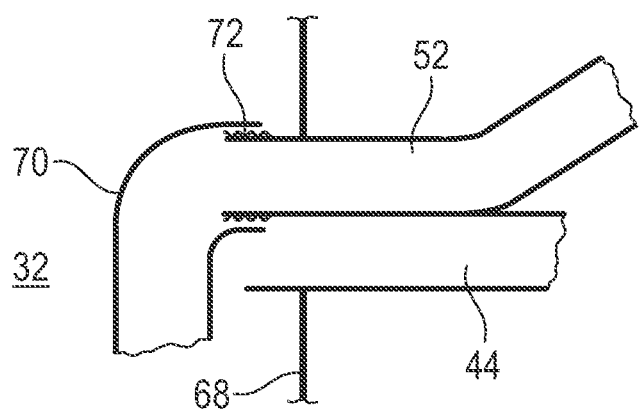
FIG. 6 shows a schematic cross section of a first variant of a third embodiment of the multiport device.
Figure 7:
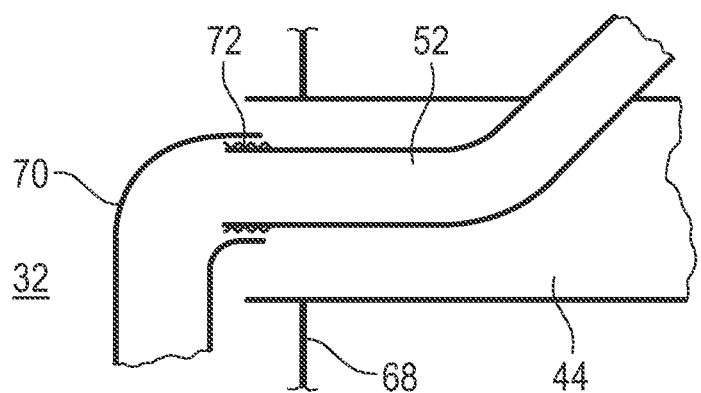
FIG. 7 shows a schematic cross section of a second variant of the third embodiment of the multiport device.

FIGS. 6 and 7 show two variants of a third embodiment of the multiport device 42. In the variant shown in FIG. 6 the flow paths 44, 52 are arranged next to each other, whereas in the variant shown in FIG. 7 the second flow path 52 is at least partially surrounded by the first flow path 44, similar to the configuration of the first embodiment shown in FIG. 4.

In both variants the multiport device 42 includes a flexible hose 70 which is attached to an inner end 72 of the second tube 56 ("inner" means inside the bioreactor 32). Thus, the flexible hose 70 forms a portion of the second flow path 52, and the free end of the flexible hose 72 inside the bioreactor 32 is the mouth 62 (not shown in FIGS. 6 and 7) of the second flow path 52. The pliability of the hose 70 significantly reduces the risk of damage to the flexible bioreactor walls and any components inside the bioreactor 32 during storage and transport.

In the embodiments shown in FIGS. 4, 6 and 7 the mouth 62 is inside the bioreactor 32, whereas the first end 48 is located directly at the first wall section 68. Such embodiments are preferred, but it could also be vice versa.

Of course, it is possible to combine certain features of the above-described embodiments. Moreover, the multiport device 42 can include additional flow paths enabling access to the interior of the bioreactor 32. Such additional flow paths can be used to supply other fluids to the cell culture medium, extract samples of the cell culture medium, insert sensors or probes, etc.

In the description of the preferred embodiments the focus is laid to a TFF module. Still, the person skilled in the art is aware that the inventive concept can also be used in connection with other loops through which a medium is circulated, such as loop including a sensor (sensor loop). Accordingly, such a setup for performing an upstream process of cell culture comprises; a bioreactor 32 including a port 34; a loop 36, preferably a sensor loop; a pump 38; a functional device, preferably a sensor; and a multiport device 42, the multiport device 42 connecting an inlet and an outlet of the loop 36 to the bioreactor 32 via the same port 34.

LIST OF REFERENCE SIGNS 10 bioreactor
12 TFF loop
14 pump
16 hollow fiber filter unit
18 first port
20 second port
22 bioreactor
24 ATF module
26 hollow fiber filter
28 diaphragm pump
30 port
32 bioreactor
34 port
36 TFF loop
38 pump
40 hollow fiber filter unit
42 multiport device
44 first flow path
46 pipe
48 first end
50 second end
52 second flow path
54 first tube
56 second tube
58 first portion
60 second portion
62 mouth
64 outer end
66 second wall section
68 first wall section
70 flexible hose
72 inner end

The invention claimed is:

1. A multiport device for connecting a loop to a single port of a bioreactor, the multiport device being configured to be fixed to the port of the bioreactor and comprising:
a first flow path configured for withdrawing fluid from the bioreactor, and
a second flow path configured for supplying fluid to the bioreactor,
the first flow path at least partially surrounds the second flow path, the first flow path having a first end adapted to be in fluid connection with the bioreactor and a second end adapted to be connected to an inlet of the loop, the loop being outside of the bioreactor,
the second flow path having an outer end adapted to be connected to an outlet of the loop and a mouth adapted to be in fluid connection with the bioreactor,
the mouth of the second flow path being distanced from the first end of the first flow path by at least 5 mm.

2. The multiport device according to claim 1, wherein the multiport device is a single-piece device.

3. The multiport device according to claim 1, wherein the distance between the first end of the first flow path and the mouth of the second flow path is at least three times greater than a diameter of an opening of the port.

4. The multiport device according to claim 1, wherein the first flow path and/or the second flow path includes at least one curved, bent or angled section.

5. The multiport device according to claim 1, wherein the first flow path is arranged next to the second flow path.

6. The multiport device according to claim 1, wherein at least the second flow path includes a flexible hose, a free end of the flexible hose forming the mouth of the second flow path.

7. A perfusion or concentrated fed-batch setup for performing an upstream process of cell culture, the setup comprising:
the bioreactor including the port,
the loop outside the bioreactor,
a pump,
a functional device or a sensor, and
the multiport device according to claim 1 fixed to the port with the mouth of the second flow path being inside the bioreactor,
the multiport device connecting the inlet and the outlet of the loop to the bioreactor via the same single port.

8. The perfusion or concentrated fed-batch setup according to claim 7, wherein the bioreactor has a first wall section and a second wall section opposite the first wall section, the port being located in the first wall section, the mouth being located closer to the second wall section than to the first wall section.

9. The perfusion or concentrated fed-batch setup according to claim 7, wherein the first end of the first flow path and the mouth of the second flow path are located at different heights in the bioreactor.

10. The perfusion or concentrated fed-batch setup according to claim 7, wherein the bioreactor includes a mixing means, the mouth being located closer to the mixing means than to a surrounding wall of the bioreactor.

11. The perfusion or concentrated fed-batch setup according to claim 7, wherein the bioreactor includes a mixing means causing a current direction in the bioreactor, the mouth being oriented such that medium from the loop supplied to the bioreactor via the second flow path flows through the mouth in a direction basically corresponding to the current direction.

12. The perfusion or concentrated fed-batch setup according to claim 7, wherein the bioreactor includes a mixing means causing a current direction in the bioreactor, the mouth being oriented such that medium from the loop supplied to the bioreactor via the second flow path flows through the mouth in a direction basically opposite to the current direction.

13. The perfusion or concentrated fed-batch setup according to claim 7, wherein the second flow path is surrounded by a baffle or a flow guide.

* * * * *